United States Patent
Nakamura et al.

[11] Patent Number: 5,907,122
[45] Date of Patent: May 25, 1999

[54] GAS INSULATED ELECTRICAL APPARATUS

[75] Inventors: Keiichiro Nakamura; Hiroki Sanuki; Takahide Watanabe; Masazumi Yamamoto, all of Tokyo, Japan

[73] Assignee: Mitsubishi Denki Kabushiki Kaisha, Tokyo, Japan

[21] Appl. No.: 08/863,469

[22] Filed: May 27, 1997

[30] Foreign Application Priority Data

May 30, 1996 [JP] Japan ................................. 8-136602

[51] Int. Cl.[6] ............................................. H05K 5/00
[52] U.S. Cl. ................................................ 174/17 GF
[58] Field of Search ........................ 174/17 R, 17 GF, 174/17.05

[56] References Cited

U.S. PATENT DOCUMENTS

| | | | |
|---|---|---|---|
| 1,394,951 | 10/1921 | Sugimura | 174/17 R |
| 1,859,969 | 5/1932 | Jansson | 336/94 X |
| 2,271,938 | 2/1942 | Etzrodt | 174/17.05 X |
| 2,743,337 | 4/1956 | Florschutz et al. | 174/17 R |
| 2,810,889 | 10/1957 | Lundgren | 174/17 GF X |
| 2,981,785 | 4/1961 | Plump | 174/17 R |
| 2,985,707 | 5/1961 | Ahearn et al. | 174/17 R |
| 3,252,065 | 5/1966 | Warner et al. | 174/17 R |
| 3,398,247 | 8/1968 | McCloud | 174/17 R |
| 4,675,720 | 6/1987 | Ikegame et al. | 174/17 GF X |

FOREIGN PATENT DOCUMENTS

| | | | |
|---|---|---|---|
| 3621268 | 1/1987 | Germany | 174/17 GF X |
| 64-2508 | 1/1989 | Japan . | |

*Primary Examiner*—Dean A. Reichard
*Attorney, Agent, or Firm*—Burns, Doane, Swecker & Mathis, L.L.P.

[57] ABSTRACT

A gas insulated electrical apparatus in which electric devices for three phases are housed within a common gas-filled vessel includes a first and a second curved wall spaced apart from each other by a first distance and a third and a fourth curved wall connected between the first and second curved walls and spaced apart from each other by a second distance smaller than the first distance to define a substantially oval cross-sectional shape. The electric devices are arranged in a row extending between the first and second walls. The first and second curved walls may have a first radius of curvature and the third and fourth curved walls may have a second radius of curvature larger than the first radius of curvature.

13 Claims, 3 Drawing Sheets

GAS INSULATED ELECTRICAL APPARATUS

BACKGROUND OF THE INVENTION

This invention relates to a gas insulated electrical apparatus in which electric devices for three phases are housed within a single vessel filled with an electrically insulating gas such as an $SF_6$ gas.

FIG. 4 is a front view showing partially in section a conventional three-phase gas-insulated switchgear apparatus disclosed in Japanese Patent Laid-Open No. 2-101907 and FIG. 5 is a sectional view of the main portion shown in FIG. 4.

In FIGS. 4 and 5, three circuit interrupters 2a, 2b and 2c for three phases are disposed within a cylindrical vessel 1 in a parallel relationship with a necessary insulating distance A between them. The vessel 1 has shunt pipes 3, 4 and 5 extending in a direction perpendicular to the direction of the row of the circuit interrupters 2a, 2b and 2c and connected to a vessel 6 and 7 containing bus bar disconnectors as well as to a vessel 8 containing cable heads. It is seen that electrical conductors 9 and 10 extend through these shunt pipes 3, 4 and 5 to connect the circuit interrupters 2a, 2b and 2c to the disconnectors and the cable heads.

Since the conventional gas insulated switchgear apparatus has the above-described structure, the cylindrical vessel 1 and the circuit interrupters 2a, 2b and 2c aligned in a row disadvantageously define therebetween spaces B which are unnecessary from the view point of the electrical insulation.

As a measure for minimizing the above spaces B, a gas insulated switchgear structure in which the vessel has an oval-shaped cross section is proposed in Japanese Patent Laid-Open No. 61-191210 for example.

FIG. 6 is a plan view of the gas insulated switchgear apparatus and FIG. 7 is a side view thereof. In FIGS. 6 and 7, the vessels 11, 12 and 13 of an oval cross-sectional shape each containing one of the circuit interrupters for three phases (not shown) are arranged in a row with their longitudinal axes of the oval cross section placed at right angles with respect to the direction of the alignment in the row and a shunt pipe 14 is disposed at the end of each of the vessels 11, 12 and 13 so that an electrical conductor (not shown) may be allowed to extend therethrough for connecting the circuit interrupter to other external electric apparatus.

However, in this arrangement, each of the circuit interrupters for three phases is contained within a respective separate vessel, so that the overall dimensions of the gas insulated switchgear apparatus is disadvantageously large.

SUMMARY OF THE INVENTION

Accordingly, the present invention has been made in order to solve the above discussed problems of the conventional design of a gas insulated electrical apparatus and has as its object the provision of a gas insulated electrical apparatus in which a dead space within the vessel is eliminated to decrease the overall dimensions.

With the above object in view, the present invention resides in a gas insulated electrical apparatus in which electric devices for three phases are housed within a common vessel filled with an electrically insulating gas under a predetermined pressure. The vessel has a first and a second curved wall spaced-apart from each other by a first distance and a third and a fourth curved wall connected between the first and second curved walls and spaced apart from each other by a second distance smaller than the first distance so that the first to fourth curved walls define together a substantially oval cross-section. Each of the electric devices is arranged in a row extending between the first and second walls. The first and second curved walls may have a first radius of curvature and the third and fourth walls may have a second radius of curvature larger than the first radius of curvature.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
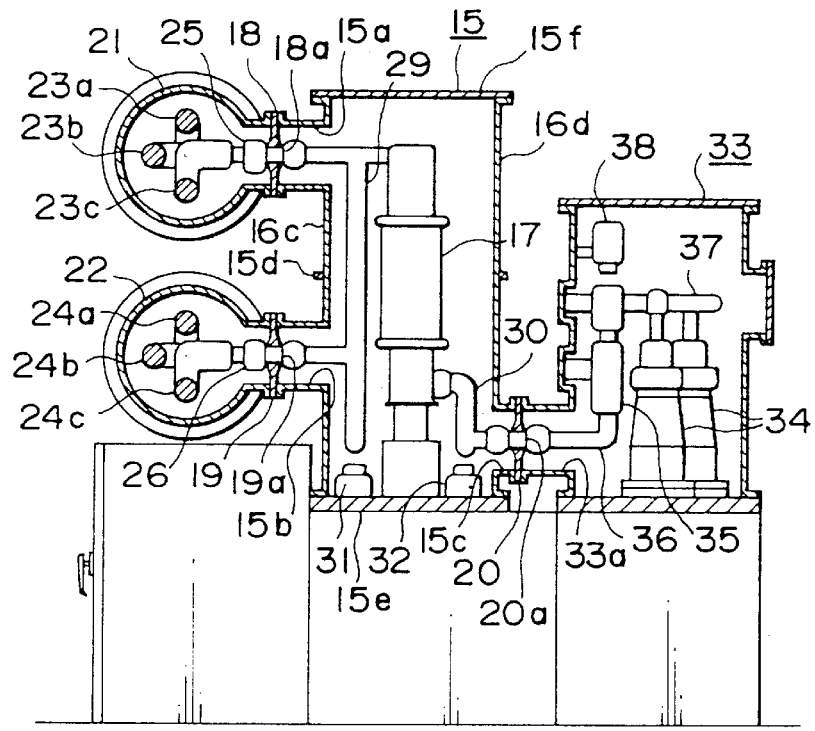
FIG. 1 is a front view partly in section showing the first embodiment of the gas insulated electrical apparatus of the present invention.
Figure 2:
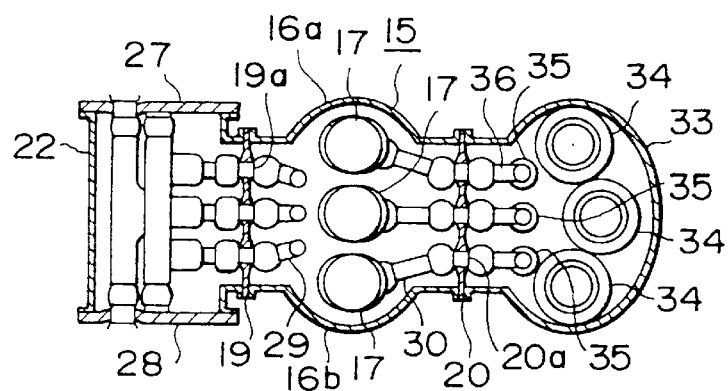
FIG. 2 is a sectional view showing the main portion of the gas insulated electrical apparatus shown in FIG. 1.

FIG. 1 is a front view partly in section showing the first embodiment of the gas insulated electrical apparatus of the present invention, and FIG. 2 is a sectional view showing the main portion of the gas insulated electrical apparatus shown in FIG. 1.

In FIGS. 1 and 2, the gas-insulated electrical apparatus of the present invention, which is illustrated as being a switchgear apparatus, comprises a hermetic vessel 15 having connection ports 15a, 15b and 15c and filled with an electrically insulating gas such as an $SF_6$ gas under a predetermined pressure. The vessel 15 comprises a first curved wall 16a and a second curved wall 16b disposed in an opposing relationship and spaced apart from each other by a first predetermined distance. The vessel 15 also comprises a third curved wall 16c and a fourth curved wall 16d disposed in an opposing relationship and spaced apart from each other by a second predetermined distance smaller than the first predetermined distance. The third and fourth curved walls 16c and 16d are connected between the first and second curved walls 16a and 16b to define a cross section of a substantially oval-shape having a shorter axis and a longer axis. The vessel 15 has an annular reinforcement rib 15d disposed around the outer circumference of the vessel 15 composed of four curved walls 16a, 16b, 16c and 16d. The vessel 15 also comprises a bottom wall 15e and a top wall 15f hermetically attached to the bottom and top open ends of the hollow cylinder of the oval-shaped cross section.

The connection ports 15a, 15b and 15c are hermetically closed by electrically insulating spacers 18, 19 and 20, respectively, so that the insulating gas may be filled under pressure therein. The insulating spacers 18, 19 and 20 support and allow electrical conductors 18a, 19a and 20a to extend therethrough, respectively. The conductors 18a, 19a and 20a are connected to conductors 29 and 30 extending from the respective circuit interrupters 17 disposed within the vessel 15 for the external connections to other electric devices. Grounding switchgears 31 and 32 are disposed within the vessel 15.

The conductors 18a extending through the spacer 18 are connected to bus bars 23a, 23b and 23c through disconnectors 25 disposed within a cylindrical tank 21 hermetically connected to the connection port 15a of the vessel 15 and filled with an electrically insulating gas such as an $SF_6$ gas at a predetermined pressure. The conductors 19a extending through the spacer 19 are connected to bus bars 24a, 24b and 24c through disconnectors 26 disposed within a cylindrical tank 22 hermetically connected to the connection port 15b of the vessel 15 and filled with an electrically insulating gas such as an $SF_6$ gas at a predetermined pressure. The cylindrical tanks 21 and 22 have electrically insulating spacers 27 and 28 attached to and hermetically closing their opposite ends for insulatingly supporting the bus bars 23a, 23b and 23c as well as the bus bars 24a, 24b and 24c therein. The conductors 18a and 19a extending through the connection ports 15a and 15b are connected to the respective circuit interrupters 17 through conductors 29 disposed within the vessel 15.

The connection port 15c of the vessel 15 is connected through the insulating spacer 20 to a connection port 33a of a tank 33 having an oval cross section and filled with an electrically insulating gas such as $SF_6$ gas under a predetermined pressure. The tank 33 contains therein line disconnectors 35 for three phases which are connected through conductors 36 to the conductor 20a supported by and extending through the insulating spacer 20. The tank 33 also contains therein three cable heads 34 connected to the disconnectors 35 through the conductors 37 and arranged with their longitudinal axes placed in parallel to the longitudinal axis of the tank 33. A grounding switchgear 38 is disposed within the tank 33 for grounding the conductors 37. The reinforcing flange 15d on the vessel 15 is not necessary when the mechanical strength of the vessel 15 is sufficient such as when the height of the vessel 15 is sufficiently short or the wall thickness of the walls of the vessel 15 is sufficiently large.

In operation, the electric power supplied through the main bus bars 23a, 23b and 23c or the main bus bars 24a, 24b and 24c is supplied through the disconnectors 25 or the disconnectors 26 and through the circuit interrupters 17, the disconnectors 35 and the cable heads 34 to the line.

Figure 3:
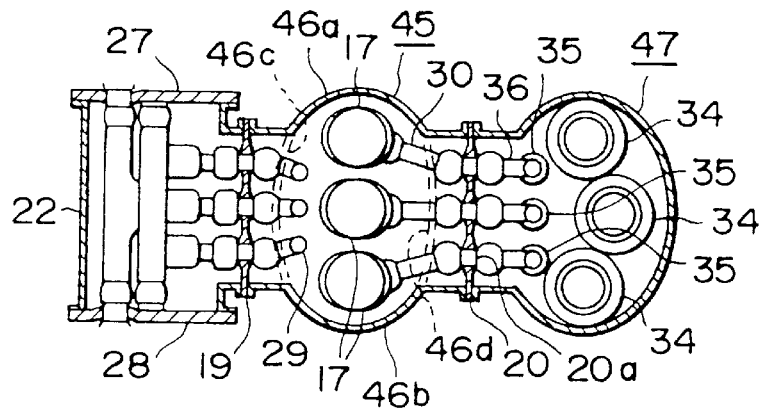
FIG. 3 is sectional view showing the main portion of the second embodiment of the gas insulated electrical apparatus of the present invention.
Figure 4:
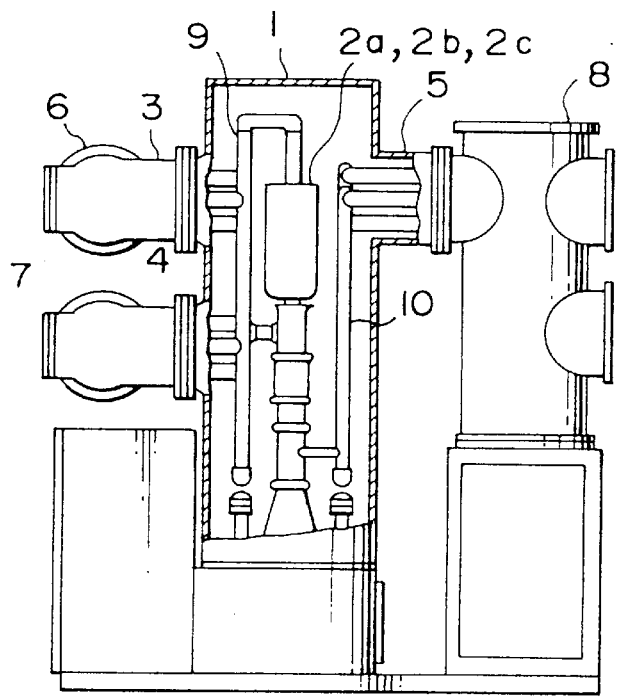
FIG. 4 is a front view showing partially in section a conventional three-phase gas-insulated switchgear apparatus.
Figure 5:
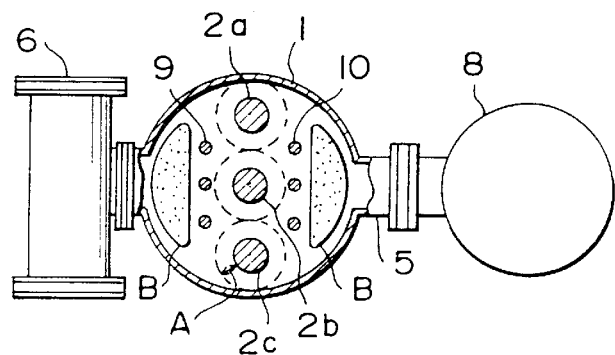
FIG. 5 is a sectional view of the main portion of the switchgear apparatus shown in FIG. 4.
Figure 6:
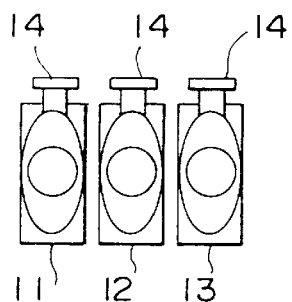
FIG. 6 is a plan view of another conventional gas insulated switchgear apparatus.
Figure 7:
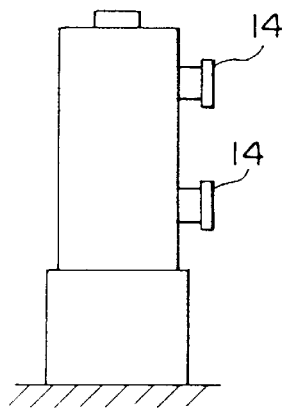
FIG. 7 is a side view of the switchgear apparatus shown in FIG. 6.

FIG. 3 illustrates in a sectional view the main portion of the second embodiment of the gas insulated electrical apparatus of the present invention. It is seen that the general structure of the gas insulated electrical apparatus of this embodiment is similar to that of the embodiment illustrated in FIGS. 1 and 2, and only the structure of the vessel 45 is different from that of the vessel 15 of the first embodiment.

More particularly, the hermetic vessel 45 is filled with an electrically insulating gas such as an $SF_6$ gas under a predetermined pressure and houses therein three circuit interrupters 17 for three phases. The vessel 45 comprises a first curved wall 46a and a second curved wall 46b that are sections of hollow cylinder having a first predetermined radius of curvature and spaced apart from each other by a first predetermined distance with their concave surface facing to each other. The vessel 45 also comprises a third curved wall 46c and a fourth curved wall 46d that are sections of hollow cylinder having a second predetermined radius of curvature larger than the first predetermined radius of curvature. The third and fourth curved walls 46c and 46d are connected between the first and second curved walls 46a and 46b and spaced apart from each other by a second predetermined distance shorter than the first predetermined distance with their concave surface facing to each other so that a hollow cylinder having a substantially oval cross section is formed by four curved walls 46a, 46b, 46c and 46d. It is seen that the circuit interrupters 17 are disposed in a row along the longitudinal axis of the oval cross section.

The gas insulated electrical apparatus also comprises a tank 47 with a curved wall within which three cable heads 34 are housed. Although the tank 47 is illustrated as being cylindrical having a generally oval-shaped cross section, it may equally have a cross-section of a rectangular or a circular shape.

According to the present invention, the cross-sectional configuration of the hermetic shape is defined by at least four curves without any straight line and may be oval in the sense of mathematical definition or a quasi-oval as may be drawn by combining two different pairs of arcs as in the second embodiment. It is to be noted that a pressure of a gas within a vessel generates a bending stress in a planar vessel wall but the pressure generates a tensile stress in a curved vessel wall. Therefore, the oval vessel of which side wall contains no planar wall is advantageous in mechanical strength over the vessel planar side wall.

Also, while the first to fourth curved walls 46a, 46b, 46c and 46d of the hermetic vessel 45 are described as having two different radii of curvature in the above embodiment, more than two radii of curvature may equally be used to construct the vessel 45 having a curved outer surface.

While the present invention has been described in conjunction with the embodiment of a gas insulated switchgear in which the circuit interrupters 17 are housed within the vessel 15 or 45, the present invention is equally applicable to other electrical apparatus in which three-phase electrical devices other than circuit interrupters are housed in a gas-filled vessel. Also, the present invention is applicable not only to the vessel containing the circuit interrupter or the like, but also to the shut pipes connected to the vessel and similar advantageous results can be obtained.

As has been described, according to the gas insulated electrical apparatus of the present invention, the hermetic vessel has first and second curved walls spaced apart from each other by a first distance and third and fourth curved walls connected between the first and second walls and spaced apart from each other by a second distance smaller than the first distance to define together a substantially oval cross-section. The electrical devices for three phase are arranged in a row extending from the first curved wall to the second curved wall which has a larger first predetermined distance therebetween. Therefore, the space between the third and fourth curved walls and the electrical devices can be minimized to a necessary insulating distance, enabling the overall outer dimensions of the apparatus to be decreased.

Also, since the curved walls of the hermetic vessel which contains a pressurized electrically insulating gas define a substantially oval cross-section and has no planar wall, the mechanical strength of the vessel is increased, allowing the usage of a thinner and lighter wall material. Also, the overall dimension of the gas insulated electrical apparatus can further be decreased.

Further, the first radius of curvature of the first and second curved walls may be larger than the second radius of curvature of the third and fourth curved walls, so that the overall dimension of the apparatus can further be decreased.

What is claimed is:

1. A gas insulated electrical apparatus in which electric devices for three phases are housed within a single vessel filled with an electrically insulating gas at a predetermined pressure, said apparatus comprising:

a first and a second curved vessel wall spaced apart from each other by a first distance and a third and a fourth curved vessel wall connected between said first and second walls and spaced apart from each other by a second distance smaller than said first distance;

said electric devices being arranged in a row extending between said first and second walls, and said first to fourth curved walls defining together a substantially oval cross-section without planar walls;

further including a tank having an oval cross-section, wherein said vessel and said tank are connected to each other through respective connection ports of said vessel and tank.

2. A gas insulated electrical apparatus as claimed in claim 1, wherein said first and second curved walls each have a first radius of curvature and said third and fourth curved walls each has a second radius of curvature larger than said first radius of curvature.

3. A gas insulated electrical apparatus as claimed in claim 1, wherein said electric devices comprise three circuit interrupters arranged in a row.

4. A gas insulated electrical apparatus as claimed in claim 1, wherein said first, second, third and fourth walls comprise sections of a hollow cylinder.

5. A gas insulated electrical apparatus as claimed in claim 1, further including an insulating spacer between said vessel and said tank.

6. A gas insulated electrical apparatus as claimed in claim 1, wherein said tank includes three cable heads arranged substantially in a row.

7. A gas insulated electrical apparatus as claimed in claim 6, wherein said three cable heads are connected to three disconnectors through three respective conductors.

8. A gas insulated apparatus of claim 7, wherein said electric devices include three circuit interrupters which are respectively electrically connected to said three disconnectors.

9. A gas insulated electrical apparatus in which electric devices for three phases are housed within a single vessel filled with an electrically insulating gas at a predetermined pressure, said apparatus comprising:

a first and a second curved vessel wall spaced apart from each other by a first distance and a third and a fourth curved vessel wall connected between said first and second walls and spaced apart from each other by a second distance smaller than said first distance;

said electric devices being arranged in a row extending between said first and second walls, and said first to fourth curved walls defining together a substantially oval cross-section without planar walls;

further including first and second cylindrical tanks, wherein said first and second tanks are each connected to said vessel through respective connection ports of said vessel and said first and second tanks.

10. A gas insulated electrical apparatus as claimed in claim 9, further including a first insulating spacer between said vessel and said first tank, and a second insulating spacer between said vessel and said second tank.

11. A gas insulated electrical apparatus as claimed in claim 9, wherein each of said first and second tanks includes three bus bars.

12. A gas insulated electrical apparatus as claimed in claim 11, wherein said electric devices include three circuit interrupters which are each electrically connected to one of said bus bars in each of said first and second tanks.

13. A gas insulated electrical apparatus in which electric devices for three phases are housed within a single vessel filled with an electrically insulating gas at a predetermined pressure, said apparatus comprising:

a first and a second curved vessel wall spaced apart from each other by a first distance and a third and a fourth curved vessel wall connected between said first and second walls and spaced apart from each other by a second distance smaller than said first distance;

said electric devices comprising three circuit interrupters which are arranged in a row extending between said first and second walls, and said first to fourth curved walls defining together a substantially oval cross-section;

a first tank having an oval cross-section, wherein said vessel and said first tank are connected to each other through respective connection ports of said vessel and first tank;

wherein said first tank includes three cable heads arranged substantially in a row, which are each connected to one of said three circuit interrupters;

second and third cylindrical tanks, wherein said second and third tanks are each connected to said vessel through respective connection ports of said vessel and said second and third tanks;

wherein each of said second and third tanks includes three bus bars, which are each electrically connected to one of said circuit interrupters.

\* \* \* \* \*